No. 717,057. Patented Dec. 30, 1902.
W. W. TUCK & A. WASSMANN.
REVERSING MECHANISM.
(Application filed Feb. 28, 1902.)

(No Model.) 2 Sheets—Sheet 1.

Witnesses:
D.W. Gardner.
F. E. Roach

Inventors:
William W. Tuck
August Wassmann
By their Attorney
Geo. Williats

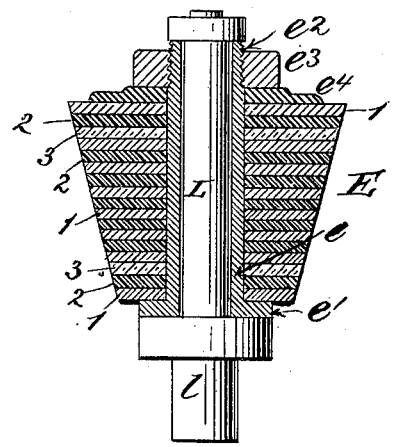
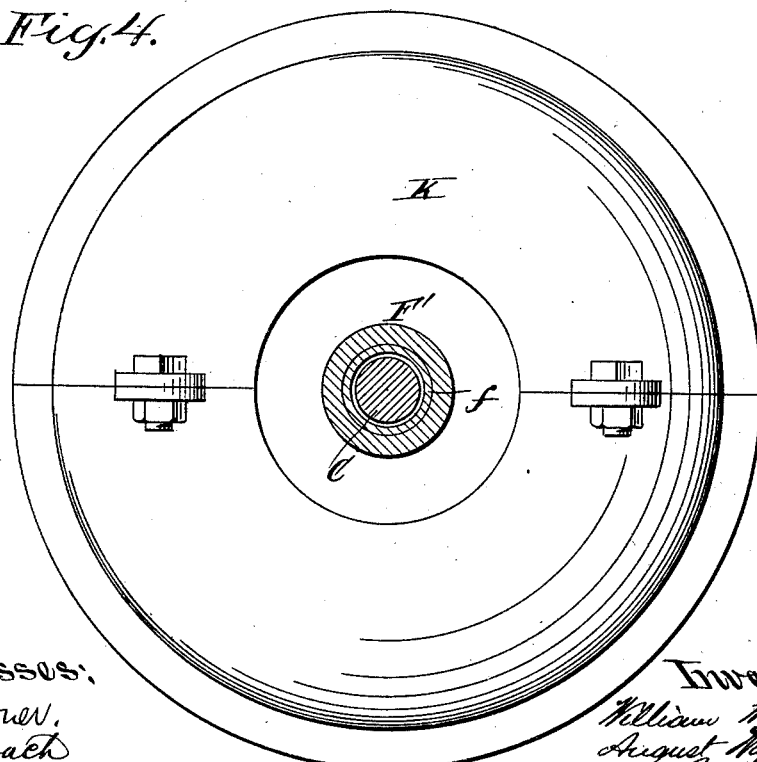

UNITED STATES PATENT OFFICE.

WILLIAM W. TUCK, OF RICHMOND HILL, AND AUGUST WASSMANN, OF ASTORIA, NEW YORK, ASSIGNORS TO ABBOT AUGUSTUS LOW, OF HORSESHOE, NEW YORK.

REVERSING MECHANISM.

SPECIFICATION forming part of Letters Patent No. 717,057, dated December 30, 1902.

Application filed February 28, 1902. Serial No. 96,046. (No model.)

*To all whom it may concern:*

Be it known that we, WILLIAM W. TUCK, residing at Richmond Hill, and AUGUST WASSMANN, residing at Halletts Point, Astoria, Queens county, State of New York, citizens of the United States, have invented certain new and useful Improvements in Reversing Mechanism, of which the following is a specification sufficient to enable others skilled in the art to which the invention appertains to make and use the same.

Our improvements relate to reversing mechanism generally, but are designed more particularly for use in connection with marine motors.

The invention is designed to afford a simple, cheap, and effective device in which gearing is dispensed with and which is, relatively speaking, noiseless in operation.

The invention consists in the arrangement and construction of parts hereinafter described, and claimed specifically.

Figure 1:
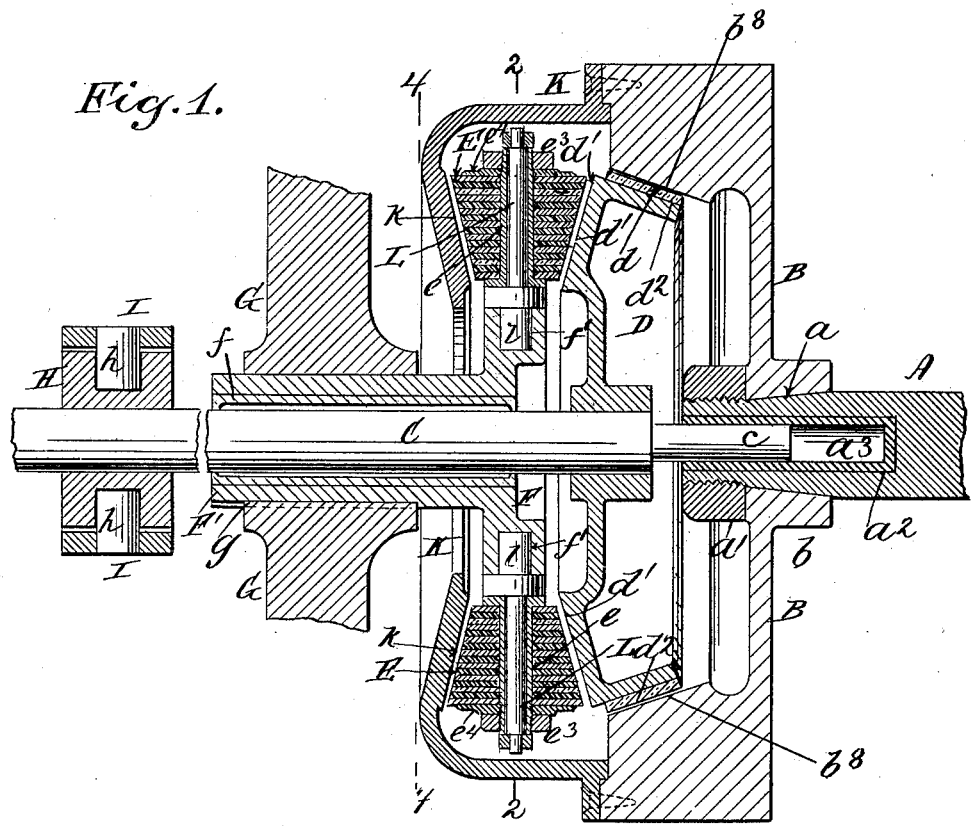
Figure 2:
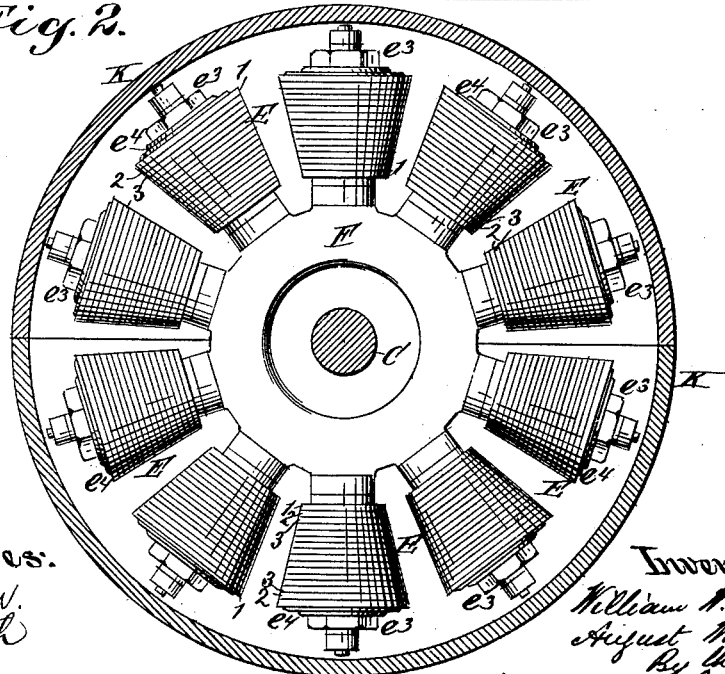

In the accompanying drawings, Figure 1 is a horizontal sectional elevation of our improved reversing device. Fig. 2 is a sectional elevation upon plane of line 2 2, Fig. 1; Fig. 3, a detail view, upon an enlarged scale, of one of the rollers; Fig. 4, a sectional elevation upon plane of line 4 4, Fig. 1.

As hereinbefore intimated, our invention is applicable to reversing mechanism for various purposes. We, however, herein show and describe a practical embodiment of the invention in mechanism for reversing the propeller-shaft of a marine motor.

In the drawings, A represents the rear of an engine or motor shaft, upon the conical portion $a$ of which is mounted the hub $b$ of the fly-wheel B, the nut $a'$ engaging with the threaded end of the shaft and securing the parts rigidly together.

C is the propeller-shaft, on the inner end of which is formed a steadying or centralizing pin $c$, fitting in a brass bushing $a^2$, inserted in a recess $a^3$, formed axially in the rear end of the power-shaft A. The clutch-disk D is mounted upon and secured to the propeller-shaft C back of the centralizing-pin $c$ and is formed with two conical bearing-surfaces $d$ and $d'$, the first, $d$, which is preferably faced with leather $d^2$ or other suitable material, engaging the correspondingly-shaped concave bearing-surface $b^8$ on the interior surface of the fly-wheel B, while the other, $d'$, engages with the conical reversing-rollers E E. The reversing-rollers E E are mounted radially upon a roller-head F upon the sleeve F', resting loosely upon the propeller-shaft C, or rather upon a bushing $f$, interposed between them. The sleeve F' is supported in the fixed bearing G, being held against rotation therein by a spline $g$, which, however, admits of its movement longitudinally within prescribed limits. The shaft C has a collar H rigidly attached to it, said collar being formed with an annular groove $h$ for engagement with a lever I, by which the shaft may be moved slightly and axially in either direction. The clutch-disk D and the collar H are each shrunk upon the shaft C in such manner as to form a rigid connection therewith.

Screwed or otherwise secured rigidly to the fly-wheel B is the shell K, made in two sections, bolted together, and formed with the internal bearing-surface $k$, inclined at an angle corresponding to that of the conical angle of the reversing-rollers E. The latter are of special construction. They are each mounted upon a steadying-pin L, the shank of which, $l$, is driven into a radial recess $f'$, formed for its reception in the head F. Each roller consists of a bushing $e$, upon which are arranged, first, a disk of leather 1, next a disk of rubber 2, and then a disk of aluminium 3, after which follow successive disks of leather 1 and rubber 2, alternately to the other or broader end of the roller where another disk of aluminium 3 is interposed between the leather and rubber, as will be understood by reference to Fig. 3. The bushing is formed with a flange $e'$ at one end and at the other with a screw-thread $e^2$ for engagement with a nut $e^3$, between which and the last disk of leather 1 is interposed a washer $e^4$, said washer $e^4$ and the flange $e'$ confining and compressing the successive layers or disks of which the roller is composed into a solid mass. We have found by actual test and continuous experiment that this form of roller gives the best and most enduring results. The aluminium disks prevent the crushing of the rubber and leather and preserve the true conical form of the roller. Furthermore, the resistance to wear afforded by the aluminium is about equal to that afforded by the leather and rubber, so that the metal does not bear unduly against the surfaces $k$ or $d'$. Brass or iron disks would be too hard for this purpose, while lead would be too soft. Hence the aluminium disks form a special function in this form of roller, preserving its shape and integrity, and wearing away evenly with the rest of the material, so as to always afford a smooth even bearing-surface, free from ridges or inequalities.

The operation of our improved reversing mechanism will be readily understood. The propeller-shaft being thrust and held forward by means of the lever I, so as to bring the conical bearing $d$ $d^2$ against the concave bearing-surface $b^8$ of the fly-wheel, the said propeller-shaft will partake of the motion of and rotate in the same direction as the fly-wheel B and power-shaft A. When it is desired to reverse the propeller, the shaft C, by means of the lever, is thrown back, causing the clutch-surface $d'$ to push the rollers E over against the conical bearing-surface $k$ on the inner side of the shell K, with the result that said rollers transmit the motion of the fly-wheel and shell to the clutch-disk D, but in a direction reverse to that of the motion of the power-shaft A.

It will be noted that by mounting the rollers on a sleeve that is free to move in either direction longitudinally or parallel to the axes of the shaft the rollers are free to adapt themselves perfectly and accurately to the bearing-surfaces $k$ and $d'$, so that wear and tear and noise are reduced to the minimum. By adjusting the propeller-shaft to the intermediate position the rollers will be out of contact with both bearing-surfaces, and the motor will run under control of its governor without imparting motion to the propeller-shaft.

What we claim as our invention, and desire to secure by Letters Patent, is—

1. The combination of the power-shaft A, fly-wheel B, formed with the bearing-surfaces $b^8$ and $k$, the propeller-shaft C, and clutch-disk D, secured thereto, said disk D being formed with the conical bearing-surfaces $d$ and $d'$, and the sliding roller head and sleeve F, carrying a plurality of radially-arranged rollers E, together with means for moving the propeller-shaft C, longitudinally in either direction, substantially as set forth.

2. The combination of the power-shaft and fly-wheel B, provided with the shell K and formed with the bearing-surfaces $b^8$, and $k$, the propeller-shaft C, carrying the clutch-disk D, said clutch-disk formed with the bearing-surfaces $d'$, $d$, $d^2$, the sliding roller-head F, carrying a plurality of radially-arranged conical rollers E and forming a part of the sleeve F', splined to the stationary bearing together with means for moving the said propeller-shaft C, longitudinally in either direction.

3. The combination of the power-shaft A, formed with the recess $a^3$, and bushing $a^2$, the fly-wheel B and casing K formed with the conical bearing-surfaces $b^8$, and $k$, the propeller-shaft C, formed with the centralizing-pin $c$, fitting in the bushing $a^2$, the clutch-disk D, secured rigidly to the propeller-shaft and formed with the conical bearing-surfaces $d$, $d^2$, and $d'$, the sliding roller sleeve and head F, F', carrying a plurality of radially-arranged reversing-rollers E and means for moving the said propeller-shaft longitudinally in either direction, substantially as and for the purpose described.

4. The combination of the power-shaft A, fly-wheel and casing B and K, formed with the conical bearing-surfaces $b^8$, and $k$, the propeller-shaft C, means for moving the same longitudinally in either direction, the clutch-disk D, rigidly secured to the propeller-shaft C, and formed with the conical bearing-surfaces $d$, $d'$, $d^2$, the sliding roller head and sleeve F, F', and a plurality of conical reversing-rollers mounted radially on said head, the bearing-surfaces of each of said rollers being formed of a plurality of disks of leather, rubber and aluminium clamped together substantially as described.

5. In combination with reversing mechanism substantially such as described, a reversing-roller E consisting of a bushing $e$, formed with the flange $e'$, and screw-thread $e^2$, nut $e^3$, washer $e^4$, and a plurality of alternating disks of leather 1, rubber 2, and aluminium 3, arranged substantially as and for the purpose set forth.

WILLIAM W. TUCK.
AUGUST WASSMANN.

Witnesses:
D. W. GARDNER,
F. E. ROACH.